United States Patent [19]

Alfonso

[11] Patent Number: 5,161,082
[45] Date of Patent: Nov. 3, 1992

[54] OVERLOAD-LIMITING METHOD BASED ON THE PWM (OR LC3) CONTROL TECHNIQUE, AND AN ELECTRONIC CIRCUIT IMPLEMENTING THE METHOD

[75] Inventor: Manuel M. Alfonso, Lisse, Netherlands

[73] Assignee: Agence Spatiale Europeenne, Paris, France

[21] Appl. No.: 699,709

[22] Filed: May 14, 1991

[30] Foreign Application Priority Data

Jun. 1, 1990 [FR] France ................... 90 06862

[51] Int. Cl.$^5$ .................... H02H 7/00; H02H 3/20
[52] U.S. Cl. ..................... 361/18; 361/10; 361/58; 361/90
[58] Field of Search ........ 361/10, 11, 18, 58, 361/90; 323/247, 259, 301, 328, 344

[56] References Cited

U.S. PATENT DOCUMENTS

| | | | |
|---|---|---|---|
| 1,696,177 | 12/1928 | Evans . | |
| 4,070,699 | 1/1978 | Einbinder | 361/86 |
| 4,184,186 | 1/1980 | Barkan | 361/10 |
| 4,309,734 | 1/1982 | Warren | 361/58 |
| 4,366,389 | 12/1982 | Hussey | 307/66 |

FOREIGN PATENT DOCUMENTS

| | | |
|---|---|---|
| 193039 | 9/1986 | European Pat. Off. . |
| 1429996 | 1/1966 | France . |
| 262095 | 6/1949 | Switzerland . |

OTHER PUBLICATIONS

Bo Tonnquist: "Current Limit Module for Power Distribution in Transient Sensitive Systems"; International Telecommunications Energy Conference, Oct. 1986, Toronto pp. 403–408, Figure 8.

*Primary Examiner*—Steven L. Stephan
*Assistant Examiner*—Matthew Nguyen
*Attorney, Agent, or Firm*—Bell, Seltzer, Park & Gibson

[57] ABSTRACT

The present invention relates to an overload-limiting method and circuit based on the PWM control technique. An overload-limiting induction coil is kept short circuited until a maximum value of a magnitude that is a function of the current flowing through the load is detected. The induction coil is put into circuit only after the maximum value of said magnitude has been detected and it is kept in circuit until a minimum value of said magnitude is detected. The magnitude may be constituted by the current flowing through the load or by the voltage across the terminals of the load. The means for short circuiting and inserting the induction coil comprise a transformer whose primary winding is constituted by the induction coil and whose secondary winding is in circuit with an electronic switch constituted by a full-wave electronic rectifier controlled by a comparator. The invention is applicable to the electronics industry.

8 Claims, 5 Drawing Sheets

OVERLOAD-LIMITING METHOD BASED ON THE PWM (OR LC3) CONTROL TECHNIQUE, AND AN ELECTRONIC CIRCUIT IMPLEMENTING THE METHOD

The present invention relates to a method of limiting an overload and to an electronic circuit implementing the method. More particularly, it relates to a method and to a circuit including a high power semiconductor and making use of control techniques known under the initials PWM or LC3 to provide active current limitation during overload conditions. PWM stands for "pulse width modulation" and LC3 stands for "limit cycle conductance control".

BACKGROUND OF THE INVENTION

Prior art circuits based on PWM (or LC3) techniques use an electronic switch associated with an induction coil to control the current.

It has been recently been observed that although this type of current limiting circuit (or switch circuit) provides very low resistance during a normal constant-load operating state, the combination of the control device, the inductance coil, and the load capacitance gives rise to a resonant network.

This LC resonant network produces a relatively high dynamic impedance (which is unacceptable in some applications), and this may give rise to problems when more than one load is connected to the overload-limiting circuit.

The operating principle of a conventional type of PWM (or LC3) switch is illustrated in FIG. 1 and consists in using a hysteresis comparator to monitor the change in current flowing through the induction coil during current limitation. The hysteresis comparator defines maximum and minimum current levels through the induction coil, which levels are predetermined as a function of the application.

A major drawback of this solution lies in the output impedance increasing linearly with frequency (20 dB/decade) because of the presence of the induction coil required to enable the PWM (or LC3) control circuit to operate. This behavior is illustrated in FIG. 2 where the impedance of the switch device is essentially determined at low frequencies by its DC resistance RDC (which resistance is given by Np.Ron where NP is equal to the number of control circuits in parallel and Ron is equal to the resistance of each circuit).

It is easy to understand with the circuit shown in FIG. 1 that when the current through the induction coil reaches a maximum value in the current-limiting mode of operation, the above-mentioned comparator causes the switch to open, and the energy stored in the induction coil is discharged to circuit ground via a diode, and when the current flowing through the induction coil reaches a minimum value during discharge, then the comparator closes the above-mentioned switch. The appearance of the output impedance of the FIG. 1 circuit is shown in FIG. 2 as already mentioned.

An object of the present invention is thus to provide an overload-limiting circuit of the type based on the PWM (or LC3) technique which is better at satisfying the practical requirements of previously known circuits of the same type provided for the same purposes, and in particular a circuit that it is capable of reducing the output impedance in the medium frequency range (1 kHz to 10 kHz) during normal operation of the control circuit, i.e. at constant load.

SUMMARY OF THE INVENTION

The present invention provides a method of limiting overload, the method comprising the following operations:

inserting an induction coil in a power supply circuit for a load to be protected, in series with said load;

detecting the current flowing through said load by means of a current detector;

comparing the current detected in this way with a maximum current and with a minimum current by means of a main hysteresis comparator controlled by the current detector;

opening a main electronic switch in the power supply circuit of the load when the detected current reaches the maximum current fixed by the comparator, said switch being opened under the control of the main comparator;

diverting the electromagnetic energy stored in the induction coil to ground while the circuit is open; and closing the main switch when the detected current reaches the minimum current fixed by the main comparator, said switch being closed under the control of the comparator;

wherein the induction coil is kept short circuited until a maximum value of a magnitude that is a function of the current flowing through the load is detected, and wherein induction coil insertion in the circuit takes place only after said maximum value of said magnitude has been detected, and is maintained until a minimum value of the said magnitude is detected.

In a preferred implementation of the method of the invention, the induction coil is kept short circuited by associating said coil with a winding constituting a secondary winding of a transformer whose primary winding is constituted by the induction coil and by short circuiting said secondary winding, with the coil being inserted by open circuiting the secondary winding, with opening and closing of the secondary winding circuit being controlled by an auxiliary electronic switch on detection of the minimum and maximum values respectively of the above-specified magnitude.

In a preferred disposition of this implementation, the auxiliary switch is constituted by a full-wave electronic rectifier controlled by an auxiliary comparator.

In a preferred embodiment of this disposition, the magnitude detected to control insertion and short circuiting of the induction coil is constituted by the current flowing through the load, and the auxiliary comparator is constituted by a monostable flip-flop controlled by the main comparator such that the opening and closing of the short circuit for the secondary winding of the transformer take place respectively after the main switch opens and closes following detection of the maximum current and the minimum current respectively.

In an advantageous variant of this embodiment, the magnitude detected for controlling insertion and short circuiting of the induction coil is constituted by the voltage across the terminals of the load to be protected, said voltage being detected by the auxiliary comparator which determines the maximum and minimum values of said voltage in such a manner that firstly the secondary winding of the transformer is open circuited and short circuited respectively on detecting the maximum value and the minimum value of the said voltage, and secondly the main switch opens only when the current detector detects said maximum current.

The present invention also provides an overload-limiting circuit, comprising:

an induction coil inserted in a power supply circuit for a load to be protected, in series with said load;

a detector for detecting the current flowing through the load;

a main hysteresis comparator for comparing the current flowing through the load with a maximum current and with a minimum current, said maximum and minimum currents being fixed by the comparator which is thus controlled by the current detector and which controls a main electronic switch in the power supply circuit for the load to open when the current detector detects the maximum current and to close when the current detector detects the minimum current;

means for diverting the electromagnetic energy stored in the induction coil to ground when the main switch is opened by the main comparator on detecting the maximum current;

wherein the circuit further includes means for keeping the induction coil short circuited until a maximum value is detected of a magnitude that is a function of the current flowing through the load, with the coil being inserted only on detection of said maximum value of said magnitude, insertion of said coil being maintained only until a minimum value of said magnitude is detected.

In a preferred embodiment of the circuit of the invention, the means for short circuiting and inserting the induction coil comprise a transformer whose primary winding is constituted by the induction coil and whose secondary winding circuit includes an auxiliary electronic switch designed to short circuit and open circuit said secondary winding, thereby respectively short circuiting and inserting the induction coil, on detecting the minimum and the maximum values respectively of the abovementioned magnitude.

In a preferred disposition of this embodiment, the auxiliary switch is constituted by a full-wave electronic rectifier controlled by an auxiliary comparator.

In a preferred variant of this disposition, the magnitude detected for controlling insertion and short circuiting of the induction coil is constituted by the current flowing through the load, and the auxiliary comparator is constituted by a monostable flip-flop controlled by the main switch in such a manner that the secondary winding of the transformer is open circuited and short circuited respectively after the main switch opens and closes respectively after detecting the maximum current and detecting the minimum current.

In an advantageous variant of this embodiment, the magnitude detected for controlling insertion and short circuiting of the induction coil is constituted by the voltage across the terminals of the load to be protected, and the auxiliary comparator which detects said voltage determines the maximum and minimum values of the voltage in such a manner that the secondary winding of the transformer is open circuited and short circuited respectively on detecting the maximum value and the minimum value of the said voltage, while the main switch opens only when the current detector detects said maximum current.

The invention includes further dispositions in addition to those mentioned above and which appear from the following description.

BRIEF DESCRIPTION OF THE DRAWINGS

Embodiments of the invention are described by way of example with reference to the accompanying drawings, in which.

It should naturally be understood that the drawings and the corresponding portions of the description are given purely to illustrate the invention and that they do not constitute any kind of limitation thereon.

DETAILED DESCRIPTION

Figure 1:
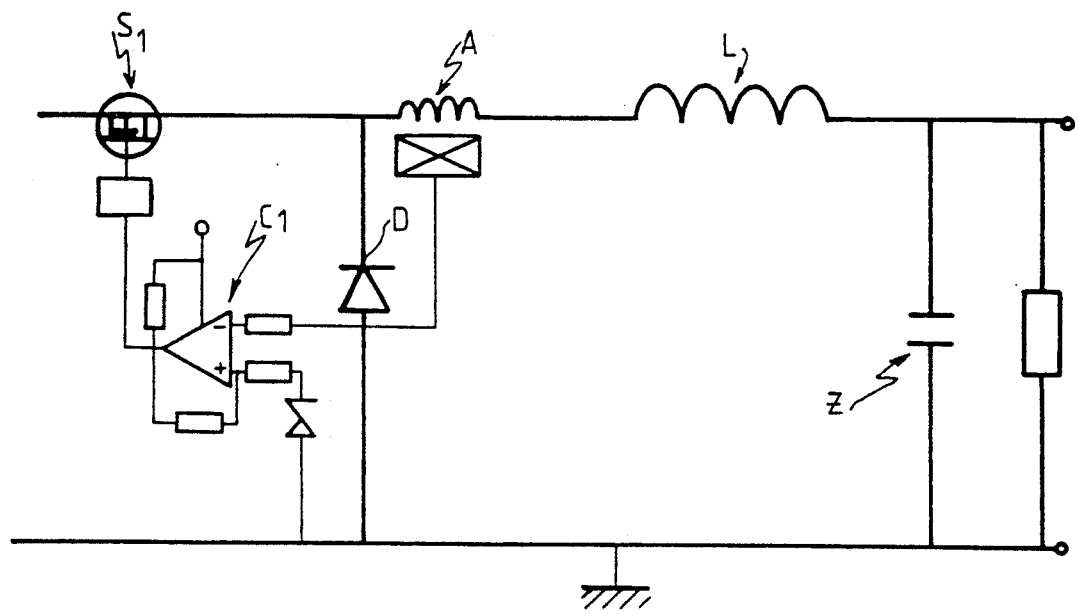
FIG. 1 is a circuit diagram of a prior art overload current limiting circuit using the PWM (or LC3) technique.

The conventional overload-limiting circuit using the PWM (or LC3) technique as shown in FIG. 1 and whose operation is mentioned above, comprises:

i) an induction coil L in series with a load to be protected Z;

ii) a Hall effect current detector A which provides electrical isolation from the power line (although any other current detection technique could be used);

iii) a hysteresis comparator C1 which fixes maximum and minimum current limit values for the LC3 (or PWM) control technique, and which is controlled by the detector A;

iv) an electronic switch S1 which is controlled by the comparator C1; and v) a diode D providing a discharge path for the electromagnetic energy stored in the coil L when the switch S1 is opened because of an overload.

Figure 3:
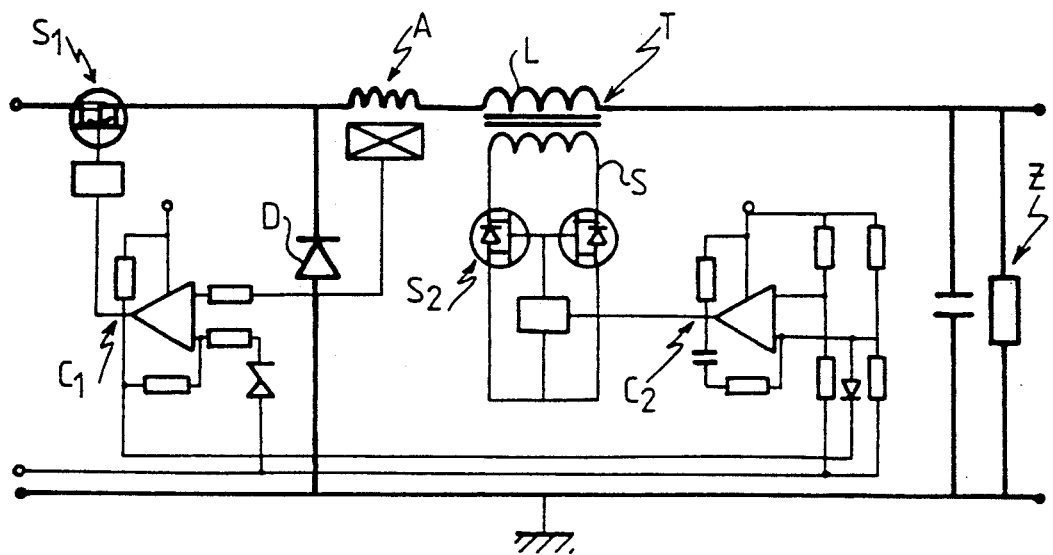
FIG. 3 is a circuit diagram of a first embodiment of the overload-limiting circuit of the present invention.
Figure 4:
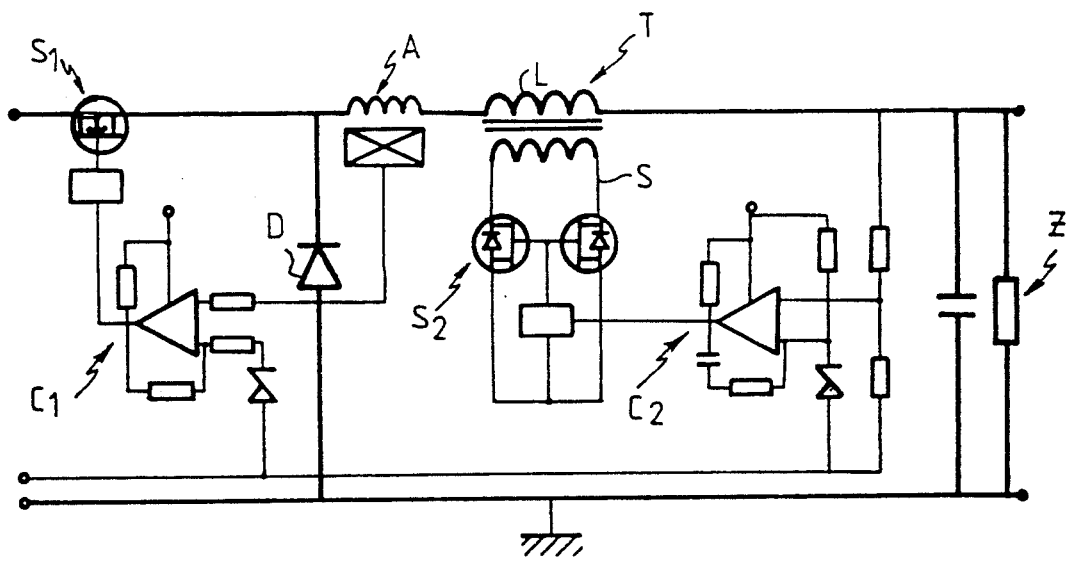
FIG. 4 shows a variant embodiment of the circuit of the invention.

The overload-limiting circuits shown in FIGS. 3 and 4 differ from the conventional circuit shown in FIG. 1 in that in addition to the above-mentioned components i) to v), i.e. in addition to the coil L, the detector A, the diode D, and the main switch S1 and the main comparator C1, they also include:

vi) a secondary winding S associated with the induction coil L, thereby defining a transformer T which advantageously has a transformation ratio of unity;

vii) an auxiliary electronic switch S2 constituted by a full-wave rectifier inserted in the secondary winding circuit S of the transformer T; and viii) an auxiliary comparator C2 for controlling the auxiliary switch S2.

This is equivalent to saying that the inductance normally provided by the single induction coil in the prior art is provided in the context of the present invention by a transformer whose secondary winding includes a full-wave rectifier switch, as mentioned above, for the purpose of inserting said inductance or of short-circuiting it.

In normal operation, the main switch S1 and the auxiliary switch S2 are both closed. Under these circumstances, the output impedance of the circuit of the present invention does not have the appearance shown in FIG. 2, but rather the appearance shown in FIG. 5, in which four different zones may be observed:

a low frequency zone 1: impedances determined by the main switch as in prior art circuits (and this impedance is equal to Np.Ron);

a transition zone 2 between low frequencies and medium frequencies: impedance increases from a low value up to a medium value because of the action of the transformer T;

a medium frequency zone 3: the impedance is determined by the main switch and by the impedance applied to the primary of the transformer T, taking account of the above-mentioned auxiliary switch being present; and a high frequency zone 4: impedance increases at 20 dB/decade, which is due to the leakage inductance of the transformer T.

Figure 2:
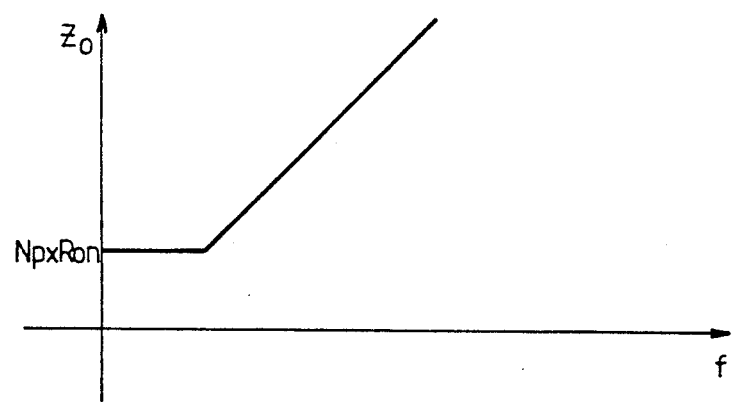
FIG. 2 is a graph showing the appearance of the output impedance of the FIG. 1 circuit as a function of frequency under normal conditions.
Figure 5:
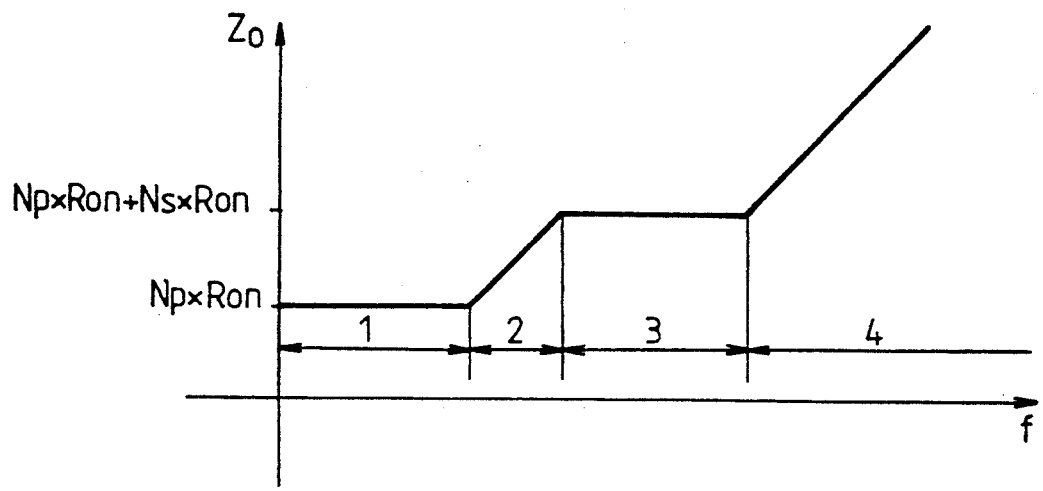
FIG. 5 is a theoretical graph showing the appearance of the output impedance of a circuit of the invention under normal conditions.

Under these circumstances, it is thus clear that under normal operating conditions, the output impedance of the circuit of the invention is reduced by the action of the transformer T, as can be seen by comparing the appearance of the output impedances shown in FIGS. 5 and 2.

While operating in current limiting mode, i.e. when an overload appears, the auxiliary switch S2 (full-wave rectifier) and the secondary winding circuit of the transformer T are open, thereby enabling the inductance of the primary winding of the transformer to be inserted into the circuit.

From this moment, the circuit operates in the same way as a prior art PWM control circuit. Peak-to-peak current monitoring is performed by the main comparator C1.

The secondary winding circuit of the transformer T can be opened using two different techniques as shown in FIGS. 3 and 4 respectively.

In FIG. 3, the auxiliary comparator C2 controls the opening of the secondary winding circuit of the transformer T, with this circuit being opened when the comparator C1 triggers opening of the main switch S1, due to an overload. The auxiliary switch S2 is then held open for a predetermined period of time (monostable action) and it is cyclically retriggered using the LC3 switching technique, thereby holding the auxiliary switch in the open state until the current has dropped below the minimum limit value.

It should be observed that the advantage of the solution shown in FIG. 3 is that it is independent of the applied voltage, with the secondary winding circuit being opened after the main switch S1 has been opened by the main comparator C1.

The above may therefore be summed up in the context of FIG. 3 by saying that LC3 (or PWM) technique control is performed by the main comparator C1 which controls the closing and the opening of the main switch S1. While operating in current limiting mode, the secondary winding circuit of the transformer T must be kept open so as to insert the inductance of the primary winding L into the circuit, and this is controlled by the auxiliary comparator C2 which keeps the secondary winding circuit open. The auxiliary comparator C2 is triggered by the main comparator C1 on each PWM action cycle because the auxiliary comparator C2 in FIG. 3 is constituted by a monostable flip-flop. If that were not the case, the secondary winding circuit of the transformer T would be closed at the end of each of monostable period: that is why the main comparator C1 retriggers opening of the auxiliary comparator C2 on each switching cycle, thereby keeping the secondary winding open circuit.

The monostable period must be longer than the period corresponding to the minimum PWM switching frequency. In other words, the main comparator C1 controls the monostable C2 to keep the secondary winding circuit of the transformer open once per LC3 (PWM) cycle.

Once LC3 (PWM) technique control is over, the main comparator C1 no longer applies any signal to the main switch S1 or to the auxiliary comparator C2. This means that:

the main switch S1 remains closed; and at the end of the monostable period, the auxiliary comparator C2 closes the auxiliary switch S2, thereby short circuiting the secondary winding of the transformer T.

Naturally, in general, it may be said that the pulse width for closing the main switch S1 is a function of the load current.

In the solution shown in FIG. 4, opening and closing of the auxiliary switch S2 are activated by detecting a predetermined voltage drop at the output from the circuit across the terminals of the load Z, and this constitutes a different criterion for detecting overload. Compared with the solution shown in FIG. 3, this solution suffers from the drawback that the auxiliary comparator C2 must be adapted to each application as a function of the nominal voltage across the load.

In the circuit of FIG. 4, it is clear that when the auxiliary comparator C2 opens the secondary winding circuit of the transformer T, then the induction coil L is inserted into the circuit, thereby increasing the output impedance Zo of the control circuit thus automatically reducing the current I, while the main switch S1 remains closed. The main switch is opened by the action of the main comparator C1 only when the current detected flowing through the primary L of the transformer T reaches a value equal to the maximum value of the current to be limited. Consequently, in the FIG. 4 circuit, operation of the auxiliary comparator C2 is independent of operation of the main comparator C1.

The two solutions adopted in the context of the present invention are summarized below.

In normal operation:

in both of the circuits illustrated in FIGS. 3 and 4 the secondary winding of the transformer T is short circuited, thereby reducing the output impedance Zo of the control circuit of the invention;

during current limitation:

the secondary winding of the transformer T is open circuit when an overload is detected:

in FIG. 3 this happens because the main switch S1 is opened by the main comparator C1 independently of the open- or closed-circuit state of the secondary winding of the transformer T;

in FIG. 4 the secondary winding circuit of the transformer T is opened by the auxiliary comparator C2 independently of the open or closed state of the main switch S1.

It may also be observed that an auxiliary switch constituted by a full-wave rectifier (including two power MOSFET transistors in the intended application of the present invention) is required to prevent conduction in the diode incorporated in an FET which would occur if only one power FET were being used (naturally other auxiliary switch configurations are possible).

The feasibility of the solution adopted by the present invention has been demonstrated by an experimental set-up tested by the applicant to demonstrate the validity of the principle of operating a control circuit based on the PWM technique having low impedance under normal conditions. This set-up had the following components:

main switch:

$4 \times \text{IRF250 with Np}=4 \text{ Ron}=85 \text{ m}\Omega$ giving $\text{RDC}=85/4 \text{ m}\Omega=21 \text{ m}\Omega$;
full-wave rectifier:

$2 \times \text{IRF250 with Ron}=85 \text{ m}\Omega$, giving a secondary winding resistance $\text{RS}=170 \text{ m}\Omega$;
inductance of the primary winding of the transformer:

$L=25 \mu H$, transformation ratio$=1/1$;

input voltage $V_{in}=120$ V DC;

maximum current $I_{max}=20$ A, $I=15$ A.

Figure 6:
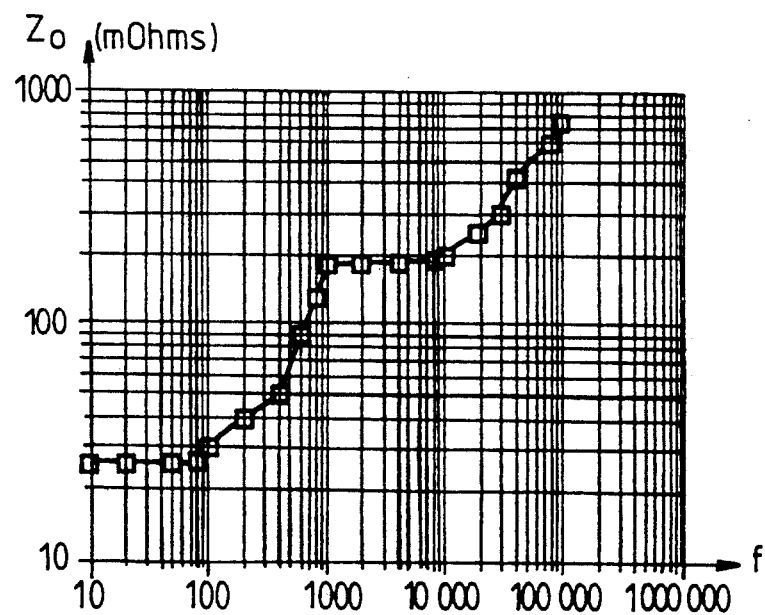
FIG. 6 is an experimental graph of output impedance and corresponding to the theoretical graph of FIG. 5.
Figure 7:
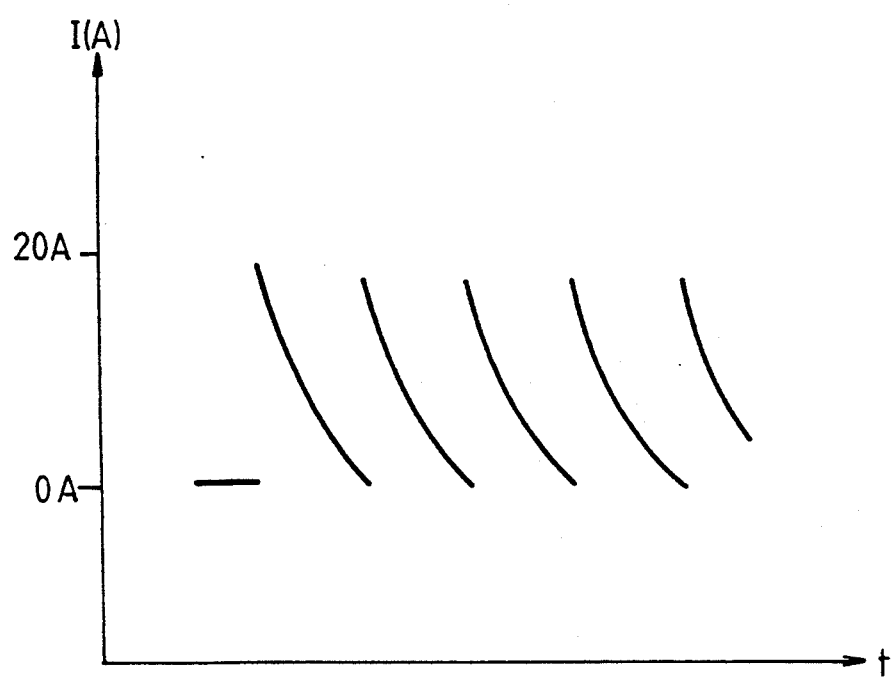
FIGS. 7 and 8 show the PWM operation of the circuit of the invention when its output is short circuited.
Figure 8:
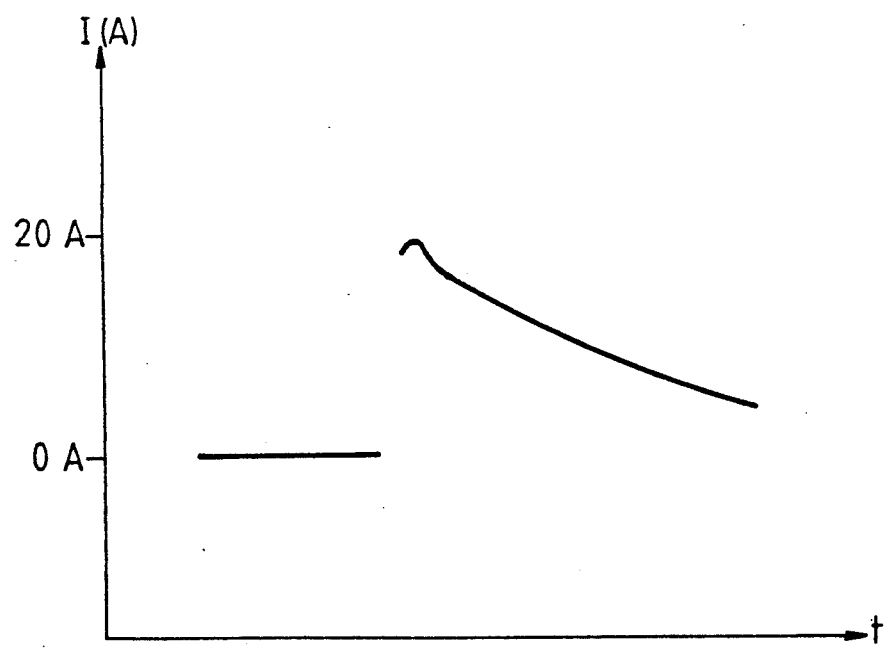

The most significant results are given in FIGS. 6, 7, and 8, in which:

FIG. 6 shows the results of measuring the output impedance Zo: it should be observed that there is no output capacitor; and FIGS. 7 and 8 show the PWC technique operation of the circuit of the invention when a short circuit is applied to the output.

Figure 9:
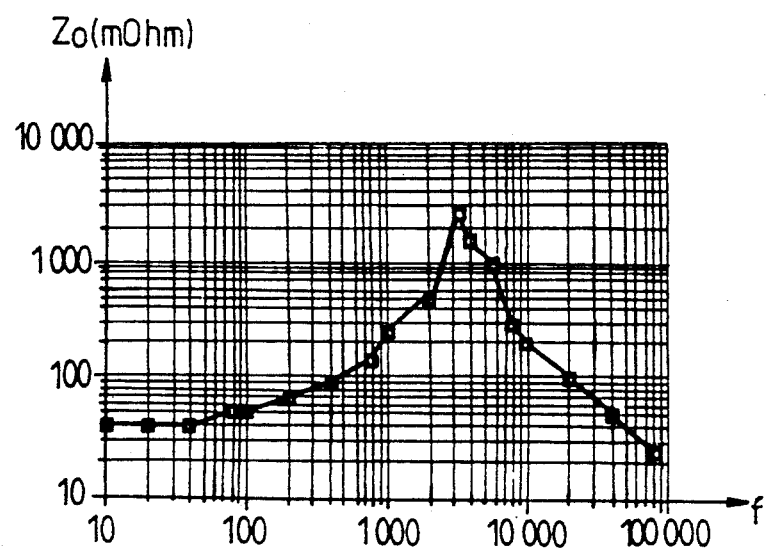
FIGS. 9 and 10 serve to compare the results of tests performed using circuits based on the PWM technique respectively in conventional manner and in accordance with the invention, with the output impedances being measured in both cases with an output load constituted by an 80 $\mu$F capacitor.
Figure 10:
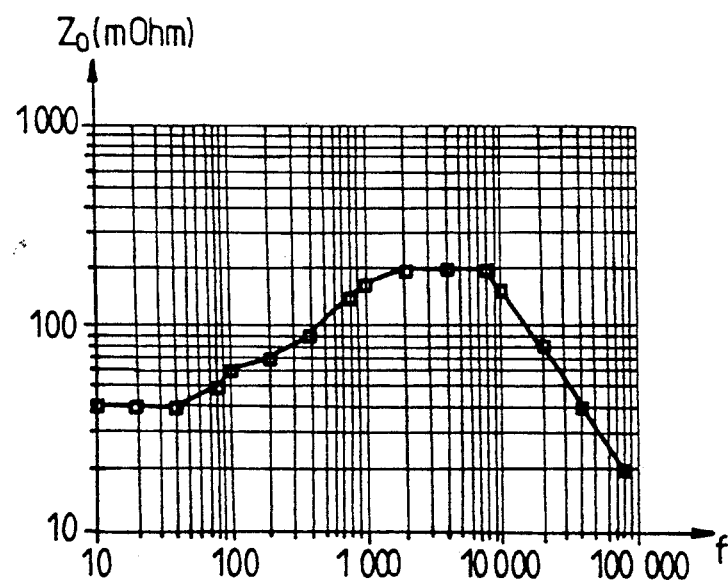

FIGS. 9 and 10 serve to compare the results of tests performed on a conventional PWM control circuit and a low impedance PWM control circuit of the present invention, for the purpose of comparing the output impedance of each of these circuits when loaded with a capacitor having a capacitance of 80 $\mu$F.

More precisely, FIG. 9 shows the measured output impedance Zo on a conventional type of PWM control circuit: its maximum value is 2.7 $\Omega$ at a frequency of 3.6 kHz (resonant frequency); this peak value is due to the resonant L-C circuit constituted by the induction coil of the control circuit and the 80 $\mu$F output capacitor.

FIG. 10 shows the measured output impedance Zo for a PWM control circuit of the present invention (i.e. designed for short circuiting the secondary winding of its transformer) which is likewise loaded with an 80 $\mu$F capacitor: in this case, the maximum impedance is given by the normal operating resistance of the switch in the circuit of the secondary winding of the transformer, as seen by the primary winding, i.e. 190 m$\Omega$.

As can be seen from the above, the invention is not limited in any way to the implementations, embodiments, and applications described above in detail. On the contrary, the invention extends to any variant that may occur to the person skilled in the art without going beyond the context or the scope of the present invention.

I claim:

1. A method of limiting overload in a power supply circuit of load to be protected, the method comprising the following operations:

inserting a switching regulator having a main electronic switch and an induction coil in series with said load;

detecting the current flowing through said load by means of a current detector;

comparing the current detected in this way with a maximum current and with a minimum current by means of a main hysterosis comparator controlled by the current detector;

opening the main electronic switch in the power supply circuit of the load when the detected current reaches the maximum current fixed by the comparator, said switch being opened under the control of the main comparator;

diverting the electromagnetic energy stored in the induction coil to ground while the circuit is open; and closing the main switch when the detected current reaches the minimum current fixed by the main comparator, said switch being closed under the control of the comparator;

maintaining the induction coil short circuited for reducing the DC output impedance of the switching regulator, until a maximum value of the magnitude that is a function of the current flowing through the load is detected, the induction coil being inserted only until a minimum value of the said magnitude is detected.

2. A method according to claim 1, wherein the induction coil is kept short circuited by a transformer action, the induction coil constituting the primary winding of a transformer whose secondary winding is short circuited and open circuited through an auxiliary electronic switch controlled by an auxiliary comparator on detection of the maximum and minimum values respectively of said magnitude.

3. A method according to claim 2, wherein the magnitude detected to control insertion and short circuiting of the induction coil is constituted by the current flowing through the load, and wherein the auxiliary comparator is constituted by a monostable flip-flop controlled by the main comparator such that the opening and closing of the short circuit for the secondary winding of the transformer take place respectively after the main switch opens and closes following detection of the maximum current and the minimum current respectively.

4. A method according to claim 2, wherein the magnitude detected for controlling insertion and short circuiting of the induction coil is constituted by the voltage across the terminals of the load to be protected, said voltage being detected by the auxiliary comparator which determines the maximum and minimum values of said voltage in such a manner that firstly the secondary winding of the transformer is open circuited and short circuited respectively on detecting the maximum value and the minimum value of the said voltage, and secondly the main switch opens only when the current detector detects said maximum current.

5. An overload-limiting circuit in a power supply circuit of a load to be protected, comprising:

a switching regulator having a main electronic switch and an induction coil inserted in series with said load;

a detector for detecting the current flowing through the load;

a main hysteresis comparator for comparing the current flowing through the load with a maximum current and with a minimum current, said maximum and minimum currents being fixed by the comparator which is thus controlled by the current detector and which controls the main electronic switch in the power supply circuit for the load to open when the current detector detects the maximum current and to close when the current detector detects the minimum current;

means for diverting the electromagnetic energy stored in the induction coil to ground when the main switch is opened by the main comparator on detecting the maximum current;

the circuit further including a winding inductively coupled to the induction coil, said winding constituting the secondary winding of a transformer whose primary winding is constituted by the induction coil, and an auxiliary electronic switch for short circuiting and open circuiting said secondary winding.

6. A circuit according to claim 5, wherein the auxiliary switch is constituted by a full-wave electronic rectifier controlled by an auxiliary comparator.

7. A circuit according to claim 5, wherein the magnitude detected for controlling insertion and short circuiting of the induction coil is constituted by the current flowing through the load, and wherein the auxiliary comparator is constituted by a monostable flip-flop controlled by the main switch in such a manner that the secondary winding of the transformer is open circuited and short circuited respectively after the main switch opens and closes respectively after detecting the maximum current and detecting the minimum current.

8. A circuit according to claim 5, wherein the magnitude detected for controlling insertion and short circuiting of the induction coil is constituted by the voltage across the terminals of the load to be protected, and wherein the auxiliary comparator which detects said voltage determines the maximum and minimum values of the voltage in such a manner that the secondary winding of the transformer is open circuited and short circuited respectively on detecting the maximum value and the minimum value of the said voltage, while the main switch opens only when the current detector detects said maximum current.

* * * * *